US010747053B2

(12) United States Patent
Yen

(10) Patent No.: US 10,747,053 B2
(45) Date of Patent: Aug. 18, 2020

(54) DISPLAY DEVICE

(71) Applicant: InnoLux Corporation, Miao-Li County (TW)

(72) Inventor: Chung-Wen Yen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/172,847

(22) Filed: Oct. 28, 2018

(65) Prior Publication Data

US 2019/0163019 A1 May 30, 2019

(30) Foreign Application Priority Data

Nov. 24, 2017 (CN) .......................... 2017 1 1189671

(51) Int. Cl.
G02F 1/13357 (2006.01)
G02F 1/1333 (2006.01)
F21V 8/00 (2006.01)
G02F 1/1335 (2006.01)

(52) U.S. Cl.
CPC ..... *G02F 1/133606* (2013.01); *G02B 6/0088* (2013.01); *G02F 1/133308* (2013.01); *G02F 1/133524* (2013.01); *G02F 1/133603* (2013.01); *G02F 1/133611* (2013.01); *G02F 1/133615* (2013.01); *G02B 6/0021* (2013.01); *G02F 2001/133322* (2013.01)

(58) Field of Classification Search
CPC .. G02B 6/0088; G02B 6/0091; G02B 6/0021; G02B 6/0028; G02F 2001/133322; G02F 1/133615; G02F 1/133606; G02F 1/133611
See application file for complete search history.

(56) References Cited

U.S. PATENT DOCUMENTS

| | | | |
|---|---|---|---|
| 2002/0044234 A1* | 4/2002 | Choi | G02B 6/0088 349/65 |
| 2003/0164913 A1 | 9/2003 | Ogawa | |
| 2006/0126362 A1 | 6/2006 | Hsieh | |
| 2008/0297687 A1 | 12/2008 | Watanabe | |
| 2010/0195014 A1 | 8/2010 | Arihara | |
| 2012/0106196 A1* | 5/2012 | Cho | G02B 6/002 362/609 |
| 2012/0327684 A1 | 12/2012 | Isobe | |
| 2014/0267971 A1 | 9/2014 | Sugimoto | |

(Continued)

*Primary Examiner* — Jessica M Merlin
(74) *Attorney, Agent, or Firm* — Winston Hsu

(57) ABSTRACT

The present disclosure provides a display device, including a light guide plate having a main body part including a first side and a second side opposite to each other and a light incident side connected to the first side and the second side and a first protrusion part and a second protrusion part disposed at the first side and the second side respectively, and a plurality of light sources. A length of the first protrusion part is greater than a length of the second protrusion part. The light sources are adjacent to the light incident side, and the distance between the light source closest to the first protrusion part and the first protrusion part is less than the distance between the light source closest to the second protrusion part and the second protrusion part in a first direction.

19 Claims, 7 Drawing Sheets

(56) References Cited

U.S. PATENT DOCUMENTS

| | | | |
|---|---|---|---|
| 2015/0146113 A1* | 5/2015 | Kasai | G02B 6/0018 |
| | | | 348/794 |
| 2015/0177446 A1 | 6/2015 | Kasai | |
| 2016/0018590 A1* | 1/2016 | Uchida | G02B 6/0046 |
| | | | 362/611 |
| 2017/0024600 A1* | 1/2017 | Lai | G02B 6/0021 |
| 2017/0184782 A1 | 6/2017 | Yoon | |

* cited by examiner

DISPLAY DEVICE

CROSS REFERENCE TO RELATED APPLICATION

This application claims priority to Chinese Patent Application No. CN201711189671.7 filed on Nov. 24, 2017, the entire content of which is incorporated herein by reference.

BACKGROUND OF THE DISCLOSURE

1. Field of the Disclosure

The present disclosure relates to a display device, and more particularly, to a display device having a backlight module.

2. Description of the Prior Art

As the technology of liquid crystal display devices continue to grow, the liquid crystal displays devices may be broadly applied to flat panel televisions, laptops, smart phones and every type of consumer electronic products. The liquid crystal panel of the liquid crystal display device is a non-self-luminous display panel, therefore it is usually necessary to dispose a backlight module at the back side of the liquid crystal panel so as to provide light for displaying images. In order to make the backlight module produce uniform and enough high brightness, multiple optical films are disposed in the backlight module, such that the light extraction ratio of light emitted from the light source to light emitted from the light emitting surface of the backlight module may be increased. In a common backlight module, in order to fix different optical films in the backlight module according to a correct order precisely, the frame of the optical films and the backlight module will be designed with a corresponding fool-proof structure. However, the design of the fool-proof structure leads to optical problems of the backlight emitting from the backlight module.

SUMMARY OF THE DISCLOSURE

The present disclosure provides a display device that includes a display panel, a light guide plate and a plurality of light sources. The light guide plate is used for guiding light to the display panel and includes a main body part, a first protrusion part and a second protrusion part. The main body part includes a first side and a second side opposite to each other, and a light incident side connected to the first side and the second side. The first protrusion part is disposed at the first side and has a first outer side opposite to the first side, and the second protrusion part is disposed at the second side and has a second outer side opposite to the second side, in which the first protrusion part has a first length at the first side, the second protrusion part has a second length at the second side, and the first length is greater than the second length. The light sources are adjacent to the light incident side of the main body part and are arranged along a first direction, and the light sources include a first light source closest to the first protrusion part and a second light source closest to the second protrusion part, in which the first light source is separated from the first outer side of the first protrusion part by a first distance in the first direction, the second light source is separated from the second outer side of the second protrusion part by a second distance in the first direction, and the first distance is less than the second distance.

These and other objectives of the present disclosure will no doubt become obvious to those of ordinary skill in the art after reading the following detailed description of the embodiment that is illustrated in the various figures and drawings.

DETAILED DESCRIPTION

To provide a better understanding of the present disclosure to those skilled in the art, the contents of the present disclosure are described in detail, taken in conjunction with specific embodiments and drawings as described below. Furthermore, the elements in various drawings are only for purposes of illustrative clarity and may not be drawn to scale. The detailed scale may be modified according to the need of the design. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

When an element or layer is referred to as being "disposed on" or "connected to" another element or layer, it can be directly dispose on or directly connected to the other element or layer, or intervening elements or layers may be present. However, when an element or layer is referred to as being "directly disposed on" or "directly connected to" another element or layer, there are no intervening elements or layers exist.

In the present disclosure, different technical features in different embodiments described in the following description can be combined, replaced, or mixed with one another to constitute another embodiment.

Figure 1:
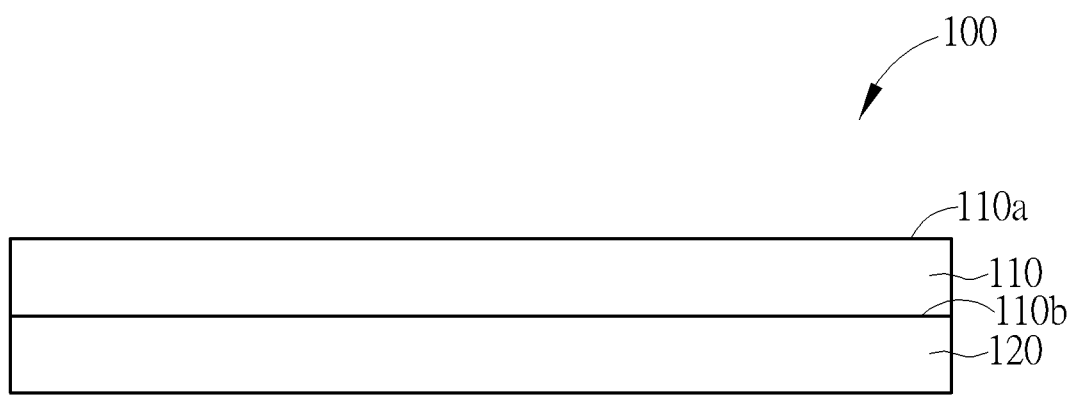
FIG. 1 is a cross-sectional schematic diagram of a display device according to an embodiment of the present disclosure.

FIG. 1 is a cross-sectional schematic diagram of a display device according to an embodiment of the present disclosure. As shown in FIG. 1, the display device 100 of the present disclosure includes a display panel 110 and a backlight module 120. The display panel 110 has a display surface 110a and a light incident surface 110b opposite to each other, the display panel 110 may for example be liquid crystal display panel or other types of non-self-luminous display panel, but not limited thereto. The backlight module 120 is disposed on the light incident surface 110b of the display panel 110, so as to produce backlight and emit the backlight into the display panel 110 through the light incident surface 110b.

Figure 2:
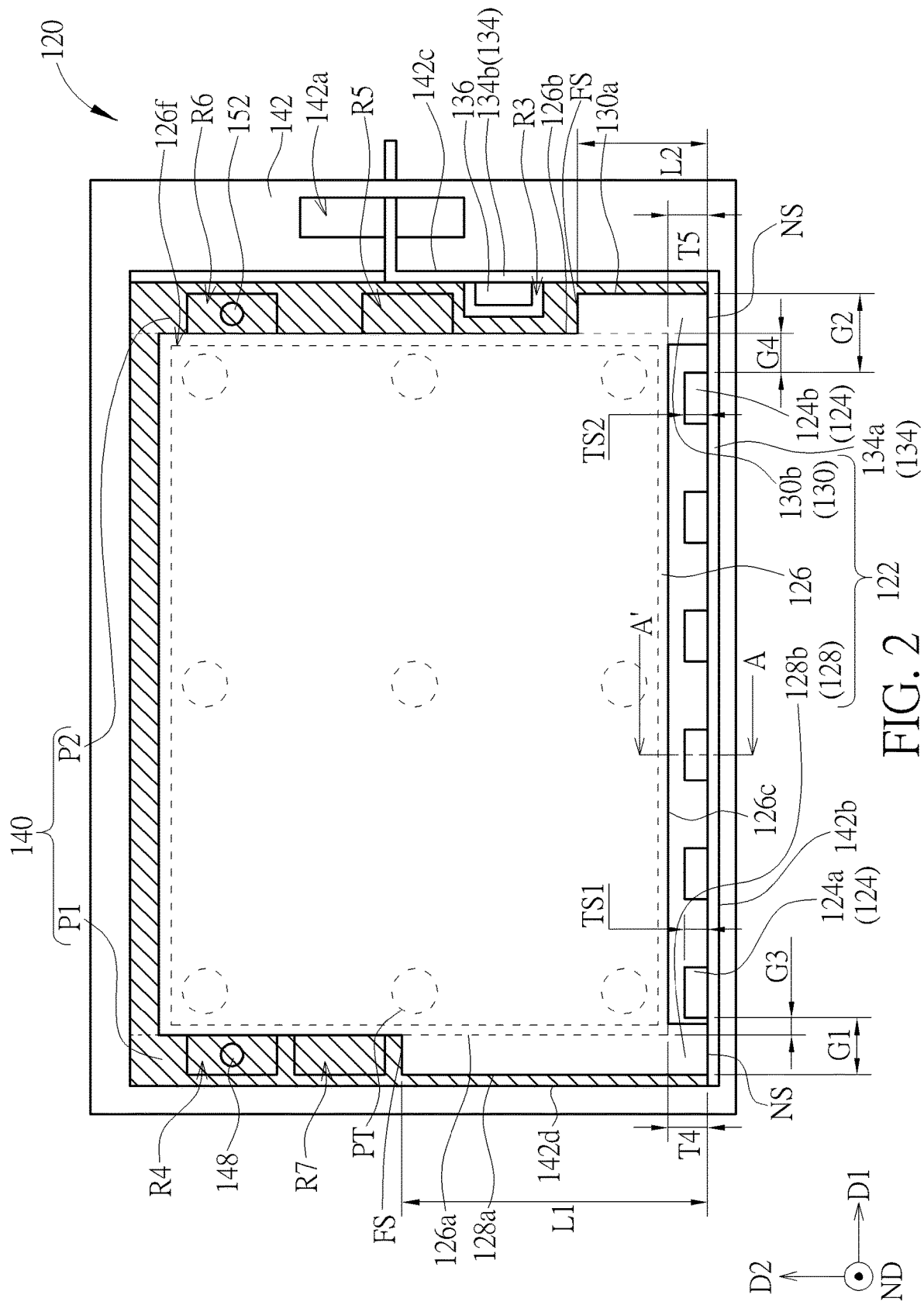
FIG. 2 is a top-view schematic diagram of a backlight module according to an embodiment of the present disclosure.
Figure 3:
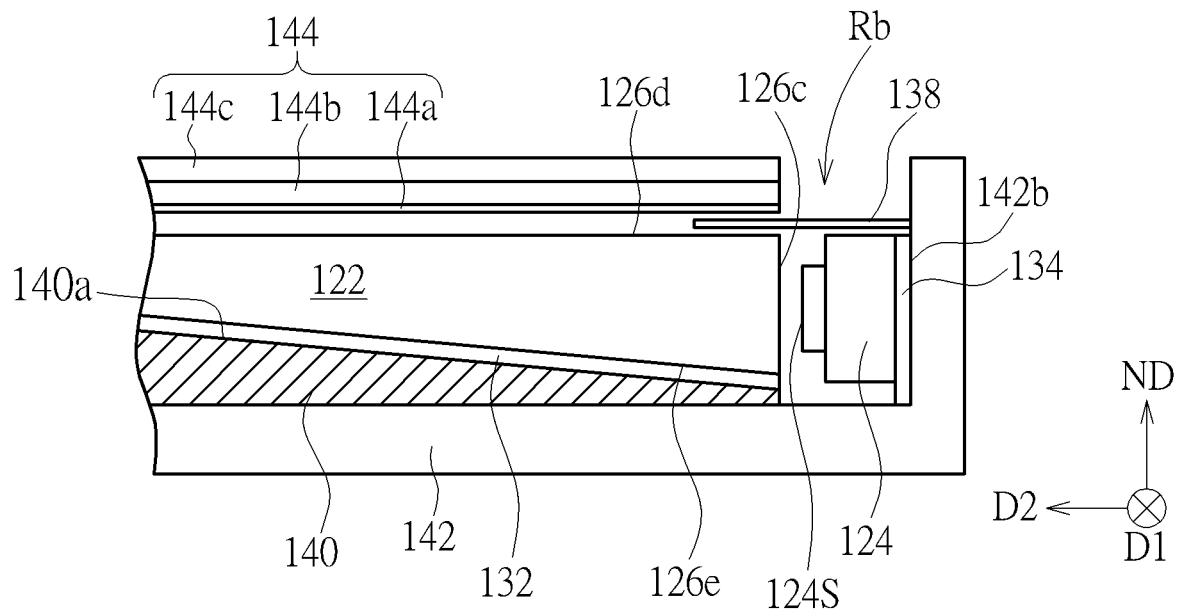
FIG. 3 is a cross-sectional schematic diagram of the backlight module taken along a cross-sectional line A-A' shown in FIG. 2 according to an embodiment of the present disclosure.
Figure 4:
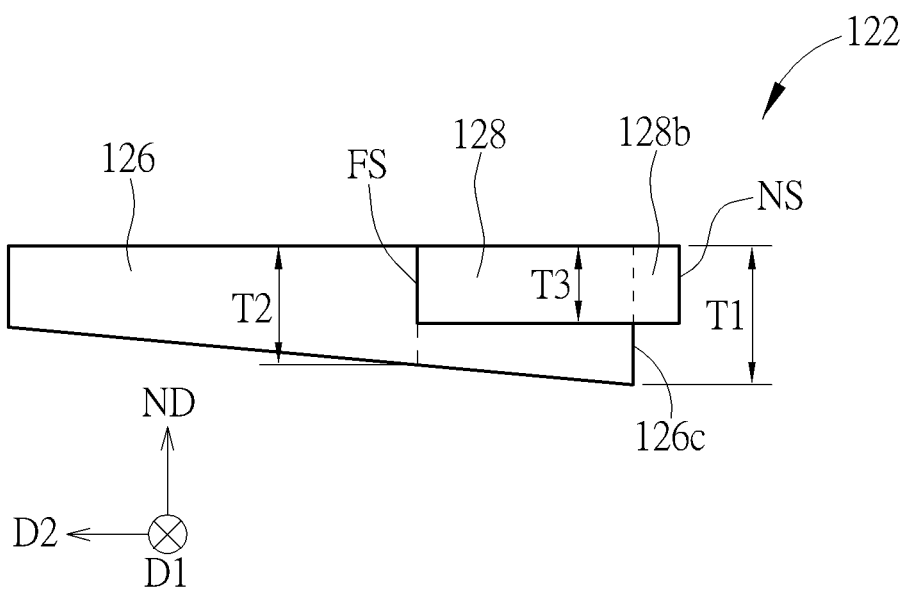
FIG. 4 is a side-view schematic diagram of a light guide plate according to an embodiment of the present disclosure.

FIG. 2 is a top-view schematic diagram of a backlight module according to an embodiment of the present disclosure, FIG. 3 is a cross-sectional schematic diagram of the backlight module taken along a cross-sectional line A-A' shown in FIG. 2 according to an embodiment of the present disclosure, FIG. 4 is a side-view schematic diagram of a light guide plate according to an embodiment of the present disclosure. To clarify the relation between the light guide plate 122 and light source 124, FIG. 2 doesn't show layers on the light guide plate 122, but the present disclosure is not limited thereto. As shown in FIG. 2 and FIG. 3, the backlight module 120 may be an edge type backlight module and include the light guide plate 122 and a plurality of light sources 124. The light sources 124 are spaced apart from the light guide plate 122. The light guide plate 122 is used for guiding light to the display panel 110. The light guide plate 122 includes a main body part 126, a first protrusion part 128 and a second protrusion part 130. The main body part 126 includes a first side 126a and a second side 126b that are opposite to each other, and a light incident side 126c adjacent to the first side 126a and the second side 126b. The first protrusion part 128 is disposed at the first side 126a of the main body part 126 and connected to the first side 126a of the main body part 126, and the second protrusion part 130 is disposed at the second side 126b of the main body part 126 and connected to the second side 126b of the main body part 126. The first protrusion part 128 has a first length L1 along the first side 126a, the second protrusion part 130 has a second length L2 along the second side 126b, and the first length L1 is greater than the second length L2. In this embodiment, the shape of the main body part 126 in a top-view may be determined according to the shape of the display surface 110a of the display device 100. For example, the shape of the main body part 126 in the top-view may be rectangular; that is, the light incident side 126c may extend in a first direction D1, the first side 126a and the second side 126b may extend in a second direction D2, and the first direction D1 is perpendicular to the second direction D2, or the shape of the main body part 126 in the top-view may be the shape of an automotive dashboard, but not limited thereto. The first side 126a and the second side 126b of this embodiment may respectively be a left side and a right side of the main body part 126; that is, the first protrusion part 128 having the longer first length L1 is at the left side of the main body part 126, and the second protrusion part 130 having the shorter second length L2 is at the right side of the main body part 126, but not limited thereto. In another embodiment, the longer first protrusion part 128 may be at the right side of the main body part 126, and the shorter second protrusion part 130 may be at the left side of the main body part 126.

The first protrusion part 128 has a first outer side 128a opposite to the first side 126a of the main body part 126, and the second protrusion part 130 has a second outer side 130a opposite to the second side 126b of the main body part 126. Furthermore, the first protrusion part 128 has a uniform width in a direction perpendicular to the first side 126a, the second protrusion part 130 may have a uniform width in a direction perpendicular to the second side 126b. In this embodiment, the first protrusion part 128 has the uniform width in the first direction D1, and the second protrusion part 130 has the uniform width in the first direction D1. For example, the width of the first protrusion part 128 in the first direction D1 and the width of the second protrusion part 130 in the first direction D1 may be the same, but not limited thereto.

Furthermore, the main body part 126 may have a light emitting surface 126d and a back surface 126e. The light emitting surface 126d and the back surface 126e are opposite to each other, and the light incident side 126c is connected to the light emitting surface 126d and the back surface 126e and between the light emitting surface 126d and the back surface 126e. The light emitting surface 126d has a normal direction ND perpendicular to the light emitting surface 126d. In this embodiment, the main body part 126 may have a scattering structure 126f disposed in the main body part 126. The scattering structure 126f may include a plurality of dots, a microstructure, or a combination thereof, and the scattering structure 126f may for example be located at the back surface 126e of the main body part 126 or be located adjacent to the back surface 126e of the main body part 126. The range of the scattering structure 126f may for example be the same as or slightly smaller than the area of the back surface 126e; that is, each side of the scattering structure 126f may respectively be aligned to a corresponding side of the back surface 126e, or each side of the scattering structure 126f and each corresponding side of the back surface 126e may have a small distance between them.

The light sources 124 are disposed adjacent to the light incident side 126c of the main body part 126, and the light emitting surfaces 124S of the light sources 124 face the light incident side 126c of the main body part 126, such that light produced from the light sources 124 can enter the light guide plate 122 through the light incident side 126c. For example, the light sources 124 may be arranged sequentially in the extending direction of the light incident side 126c (that is, the first direction D1) and spaced apart by distances, and any two of the adjacent light sources 124 may for example have the same distance, but not limited thereto. The light sources 124 may be light emitting components such as light emitting diodes (LED), mini LED, micro LED, quantum dot LED, or OLED, but not limited thereto. Furthermore, the light sources 124 may include a first light source 124a closest to the first protrusion part 128 and a second light source 124b closest to the second protrusion part 130. The first light source 124a is separated from the first outer side 128a of the first protrusion part 128 by a first distance G1 in the first direction D1, the second light source 124b is separated from the second outer side 130a of the second protrusion part 130 by a second distance G2 in the first direction D1, and the first distance G1 is less than the second distance G2. In this embodiment, the backlight module 120 may further include a reflector 132 adjacent to the back surface 126e of the light guide plate 122. Through the reflector 132, the light entering the light guide plate 122 may be reflected toward the light emitting surface 126d. The light scattered by the scattering structure 126f may be emitted out through the light emitting surface 126d of the main body part 126. It is noted that, when there is no intersection between the light sources 124 and the outer side of the protrusion part in the first direction D1, the distance between the light sources 124 and an extending line of the outer side of the protrusion part in the second direction D2 in the first direction D1 is measured.

The first protrusion part 128 and the second protrusion part 130 may include a near-light side NS and a far-light side FS opposite to each other, in which each near-light side NS is closer to the light sources 124 than the corresponding far-light side FS. More specifically, the near-light side NS of the first protrusion part 128 is adjacent to the first light source 124a, and the near-light side NS of the second protrusion part 130 is adjacent to the second light source 124b. In this embodiment, the near-light side NS and the light incident side 126c of the main body part 126 are not disposed in a same line. Specifically, the first protrusion part 128 may have a first sub-portion 128b protruded from the light incident side 126c of the main body part 126; that is, the first sub-portion 128b is more protruded than the light incident side 126c in a side-view, as shown in FIG. 4. The second protrusion part 130 may have a second sub-portion 130b protruded from the light incident side 126c of the main body part 126; that is, the second sub-portion 130b is more protruded than the light incident side 126c in the side-view. Both a thickness T4 of the first sub-portion 128b in the second direction D2 and a thickness T5 of the second sub-portion 130b in the second direction D2 are greater than a thickness TS1 of the first light source 124a and a thickness TS2 of the second light source 124b in the second direction D2 respectively.

It is noted that, since the second length L2 of the second protrusion part 130 is shorter than the first length L1 of the first protrusion part 128, when the first distance G1 and the second distance G2 are equal, the distance from the second light source 124b to the corner that is formed by connecting the second outer side 130a to the far-light side FS of the second protrusion part 130 is less than the distance from the first light source 124a to the corner that is formed by connecting the first outer side 128a to the far-light side FS of the first protrusion part 128, such that when the intensity of light generated from the first light source 124a and the intensity of light generated from the second light source 124b are the same, the intensity of the light of the first light source 124a arriving the corner of the first protrusion part 128 will be less than the intensity of the light of the second light source 124b arriving the corner of the second protrusion part 130. For this reason, the intensity of the light reflected by the corner of the second protrusion part 130 will be greater than the intensity of the light reflected by the corner of the first protrusion part 128, such that the intensity of the light emitted out of a portion of the light emitting surface 126d corresponding to the second protrusion part 130 will be greater than the intensity of the light emitted out of another part of the light emitting surface 126d corresponding to the first protrusion part 128, thereby results in non-uniformity of the backlight. For example, in terms of the method of 9-points-uniformity measurement that is to uniformly distribute 9 points PT arranged in a matrix formation on the light emitting surface 126d of the light guide plate 122 and then to measure the light intensity of the light emitting surface 126d at the position of each point PT, when the first distance G1 and the second distance G2 are the same, the light intensity measured from the point PT at the lower-left corner is about 1216.72 cd/m$^2$, and the light intensity measured from the point PT at the lower-right corner is about 1310.34 cd/m$^2$, and therefore the light intensity of the point PT adjacent to the shorter second protrusion part 130 will be greater than the light intensity of the point PT adjacent to the longer first protrusion part 128.

Hence, non-uniformity of the backlight occurs. However, in this embodiment, through adjusting the first distance G1 to be less than the second distance G2, the intensity of the light reflected by the corner of the second protrusion part 130 may approximate to the intensity of the light reflected by the corner of the first protrusion part 128, hence improving the uniformity of the backlight. The first distance G1 and the second distance G2 may for example respectively be 9.45 mm and 10.37 mm, but not limited thereto. Moreover, the first light source 124a is separated from the first side 126a by a third distance G3 in the first direction D1, the second light source 124b is separated from the second side 126b by a fourth distance G4 in the first direction D1, and when the width of the first protrusion part 128 in the first direction D1 and the width of the second protrusion part 130 in the first direction D1 are equal, the third distance G3 may be less than the fourth distance G4. The difference between the third distance G3 and the fourth distance G4 may be greater than or equal to 1 mm and less than or equal to 10 mm, but not limited thereto. It is noted that, when there is no intersection between the first light source 124a and the first side 126a in the first direction D1 or no intersection between the second light source 124b and the second side 126b in the first direction D1, the distance between the first light source 124a and an extending line of the first side 126a along the second direction D2 in the first direction D1 is to be measured, or the distance between the second light source 124b and an extending line of the second side 126b along the second direction D2 in the first direction D1 is to be measured.

As shown in FIG. 4, for the light guide plate 122 in this embodiment, the first protrusion part 128 has a consistent thickness T3 in the normal direction ND of the light emitting surface 126d, and the second protrusion part 130 may also have a consistent thickness in the normal direction ND. Furthermore, the thickness T3 of the first protrusion part 128 may for example be the same as the thickness of the second protrusion part 130, but not limited thereto. In one variant embodiment, the thickness T3 of the first protrusion part 128 and the thickness of the second protrusion part 130 may not be the same. Besides, the thickness of the main body part 126 in the normal direction ND is not consistent. Specifically, the thickness T3 of the first protrusion part 128 in the normal direction ND is different from the thickness T1 of the main body part 126 at the light incident side 126c in the normal direction ND, and the thickness T3 of the first protrusion part 128 in the normal direction ND is different from the thickness T2 of a portion of the main body part 126 corresponding to the far-light side FS of the first protrusion part 128 in the normal direction ND. For example, the thickness T2 of the portion of the main body part 126 corresponding to the far-light side FS of the first protrusion part 128 may be less than the thickness T1 of the main body part 126 at the light incident side 126c; that is, the longer the distance between a portion of the main body part 126 and the light incident side 126c is, the thinner the thickness of the portion of the main body part 126 in the normal direction ND is. Furthermore, the thickness T3 of the first protrusion part 128 may be less than the thickness T2 of the portion of the main body part 126 corresponding to the far-light side FS of the first protrusion part 128.

Refer to FIG. 2 and FIG. 3 again. The backlight module 120 of this embodiment may further include a flexible printed circuit board 134 for electrically connecting the light sources 124 to the outside electric power. The flexible printed circuit board 134 includes a connection part 134a and an extension part 134b, in which the connection part 134a is connected to the extension part 134b, the light sources 124 are disposed on the connection part 134a, and a portion of the extension part 134b is adjacent to the second outer side 130a. In this embodiment, the backlight module 120 may selectively include a chip 136 for controlling the switch or the light intensity of the light sources 124. The chip 136 is disposed on the extension part 134b. The backlight module 120 in this embodiment may selectively include a light-shielding film 138 disposed on the light sources 124 to avoid leakage of light.

Figure 5:
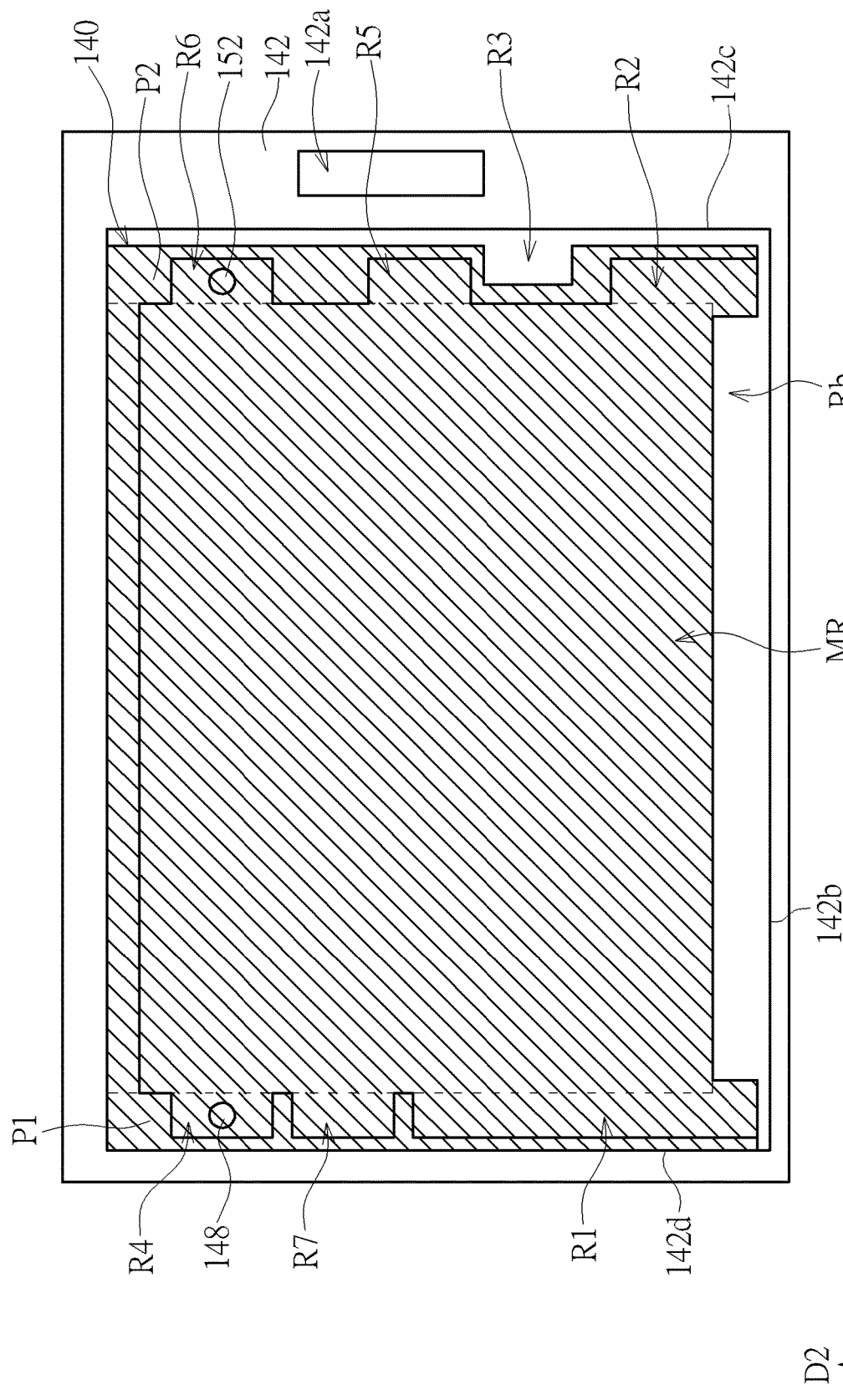
FIG. 5 is a top-view schematic diagram of a frame and a back plate according to an embodiment of the present disclosure.

In this embodiment, the backlight module 120 may further include a frame 140, a back plate 142 and an optical film stack 144. Wherein, the frame 140 and the back plate 142 are used for accommodating the light guide plate 122, the reflector 132, the light sources 124 and the flexible circuit board 134. FIG. 5 is a top-view schematic diagram of the frame and the back plate according to an embodiment of the present disclosure. As shown in FIG. 2, FIG. 3 and FIG. 5, the frame 140 has a first portion P1 and a second portion P2. The first portion P1 is adjacent to the first side 126a of the main body part 126, and the first portion P1 has a first recess R1 disposed correspondingly to the first protrusion part 128. The second portion P2 is adjacent to the second side 126b of the main body part 126, and the second portion P2 has a second recess R2 disposed correspondingly to the second protrusion part 130. Specifically, besides the first recess R1 and the second recess R2, the frame 140 may further include a main recess MR disposed correspondingly to the main body part 126. The main recess MR is disposed between the first recess R1 and the second recess R2, the first recess R1 and the second recess R2 is respectively connected to the main recess MR, the first portion P1 and the second portion P2 are disposed respectively at the two opposite sides of the main recess MR. Therefore, the main recess MR may be used for accommodating the main body part 126 of the light guide plate 122, the first recess R1 may be used for accommodating the first protrusion part 128 of the light guide plate 122, and the second recess R2 may be used for accommodating the second protrusion part 130 of the light guide plate 122. In order that the first recess R1 and the second recess R2 can respectively accommodate the first protrusion part 128 and the second protrusion part 130, the length of the first recess R1 in the second direction D2 is also greater than the length of the second recess R2 in the second direction D2. For example, the length of the first recess R1 in the second direction D2 may be substantially the same as or slightly greater than the first length L1, and the depth of the first recess R1 may be greater than or equal to the third thickness T3 of the first protrusion part 128 in the normal direction ND, such that the first protrusion part 128 may be fixed in the first recess R1. Similarly, the length of the second recess R2 in the second direction D2 may be substantially the same as or slightly greater than the second length L2, and the depth of the second recess R2 may be greater than or equal to the thickness of the second protrusion part 130 in the normal direction ND, such that the second protrusion part 130 may be fixed in the second recess R2. The depth of the main recess MR may be correspondingly adjusted according to the thickness of the main body part 126. Since the third thickness T3 is less than the second thickness T2, the depth of the main recess MR corresponding to each far-light side FS may be greater than the depth of the first recess R1 and the depth of the second recess R2. It is noted that, when the light guide plate 122 is disposed in the recess of the frame 140, through the design of the length difference between the first recess R1 and the second recess R2 in the second direction D2 (that is so-called mistake-proofing design), misplacement of the light emitting surface 126d and the back surface 126e of the light guide plate 122 may be avoided, or inversion of the upper surface and the lower surface of each optical film of the optical film stack 144 may also be avoided. Besides, a portion of the frame 140 is located between the back plate 142 and the light guide plate 122. Specifically, the portion of the frame 140 has a bottom surface 140a facing the light guide plate 122. Since the back surface 126e of the main body part 126 is not parallel to the light emitting surface 126d, in order that the light emitting surface 126d is substantially parallel to the back surface of the back plate 142, the bottom surface 140a of the portion may be parallel to the back surface 126e of the light guide plate 122; that is, the thickness of the frame 140 in the normal direction ND is not consistent. The frame 140 may for example include a reflective material, so as to reflect the light in the light guide plate 122.

The back plate 142 is disposed corresponding to the light guide plate 122 and may has a back plate recess Rb, so as to accommodate the light guide plate 122, the frame 140 and the light sources 124. The light sources 124 are disposed in the back plate recess Rb between the light incident side 126c of the light guide plate 122 and a sidewall 142b of the back plate 142. To make the back plate 142 be able to accommodate the frame 140, the light guide plate 122, the light sources 124 and layers on the light guide plate 122, the depth of the back plate recess Rb of the back plate 142 may be greater than the depth of the main recess MR of the frame 140, the thickness of the light guide plate 122 and the thickness of the layers on the light guide plate 122. Besides, the connection part 134a of the flexible circuit board 134 may be disposed on the sidewall 142b of the back plate recess Rb, so that the light emitting surfaces 124S of the light sources 124 disposed on the connection part 134a can face the light incident side 126c of the light guide plate 122. The connection part 134a may extend along the sidewall 142b of the back plate recess Rb, and the extension part 134b may extend to be between the second portion P2 of the frame 140 and the sidewall 142c of the corresponding back plate recess Rb. It is noted that, a portion of the connection part 134a may be between the first sub-portion 128b of the light guide plate 122 and the sidewall 142b of the back plate 142 and between the second sub-portion 130b and the sidewall 142b of the back plate 142, and therefore through the thickness T4 of the first sub-portion 128b and the thickness T5 of the second sub-portion 130b being greater than the thickness TS1 of the first light source 124a and the thickness TS2 of the second light source 124b respectively, a distance between the light emitting surface 124S of each light source 124 and the light incident side 126c of the main body part 126 may be defined, thereby avoiding the light guide plate 122 and each light source 124 being too close to each other and increasing the uniformity of the light entering the light guide plate 122. In another embodiment, the light guide plate 122 may not include the first sub-portion 128b and the second sub-portion 130b, such that the near-light sides of the first protrusion part 128 and the second protrusion part 130 and the light incident side of the main body part 126 may be aligned. Also, to avoid each light source 124 and the light guide plate 122 being too close to each other, the first recess R1 and the second recess R2 may not extend to the flexible circuit board 134, and instead the inner sidewalls of the first recess R1 and the second recess R2 facing the flexible circuit board 134 may be substantially aligned to the light incident side of the main body part 126, such that the distance between the light emitting surface 124S of each light source 124 and the light incident side 126c of the main body part 126 may be defined through the first portion P1 between the first recess R1 and the flexible circuit board 134 and the second portion P2 between the second recess R2 and the flexible circuit board 134.

The back plate 142 of this embodiment may optionally include an opening 142a, and another portion of the extension part 134b of the flexible circuit board 134 may penetrate the opening 142a to extend to the outside of the back plate 142, so as to be electrically connected to the outside component or the electric power. It is noted that, the length of the second recess R2 of the second portion P2 in the second direction D2 is less than the length of the first recess R1 of the first portion P1 in the second direction D2, and therefore the length of a portion of the second portion P2 between the second recess R2 and the sidewall 142c of the back plate recess Rb in the second direction D2 will be less than the length of a portion of the first portion P1 between the first recess R1 and the sidewall 142d of the back plate recess Rb in the second direction D2. That is to say, the portion of the second portion P2 having a width in the first direction D1 that is greater than the width of the second recess R2 is longer than the portion of the first portion P1 having a width in the first direction D1 that is greater than the width of the first recess R1, so that the strength of the structure of the second portion P2 is better than the strength of the structure of the first portion P1. Hence, as compared with disposing the extension part 134b between the first portion P1 and the sidewall of the back plate recess Rb, through disposing the extension part 134b between the second portion P2 and the sidewall 142c of the back plate recess Rb, break of the first portion P1 due to insufficient strength may be avoided. In this embodiment, since the second portion P2 has enough strength, the second portion P2 may further include a third recess R3 facing the sidewall 142c of the back plate recess Rb and being disposed correspondingly to the chip 136. That is to say, the third recess R3 may be used for accommodating the chip 136 on the extension part 134b, such that disposition of the chip 136 will not affect the frame width of the display device 100. Besides, the width of the connection part 134a in the normal direction ND may be less than the depth of the back plate recess Rb of the back plate 142. The back plate 142 may for example include a metal material, but not limited thereto.

Figure 6:
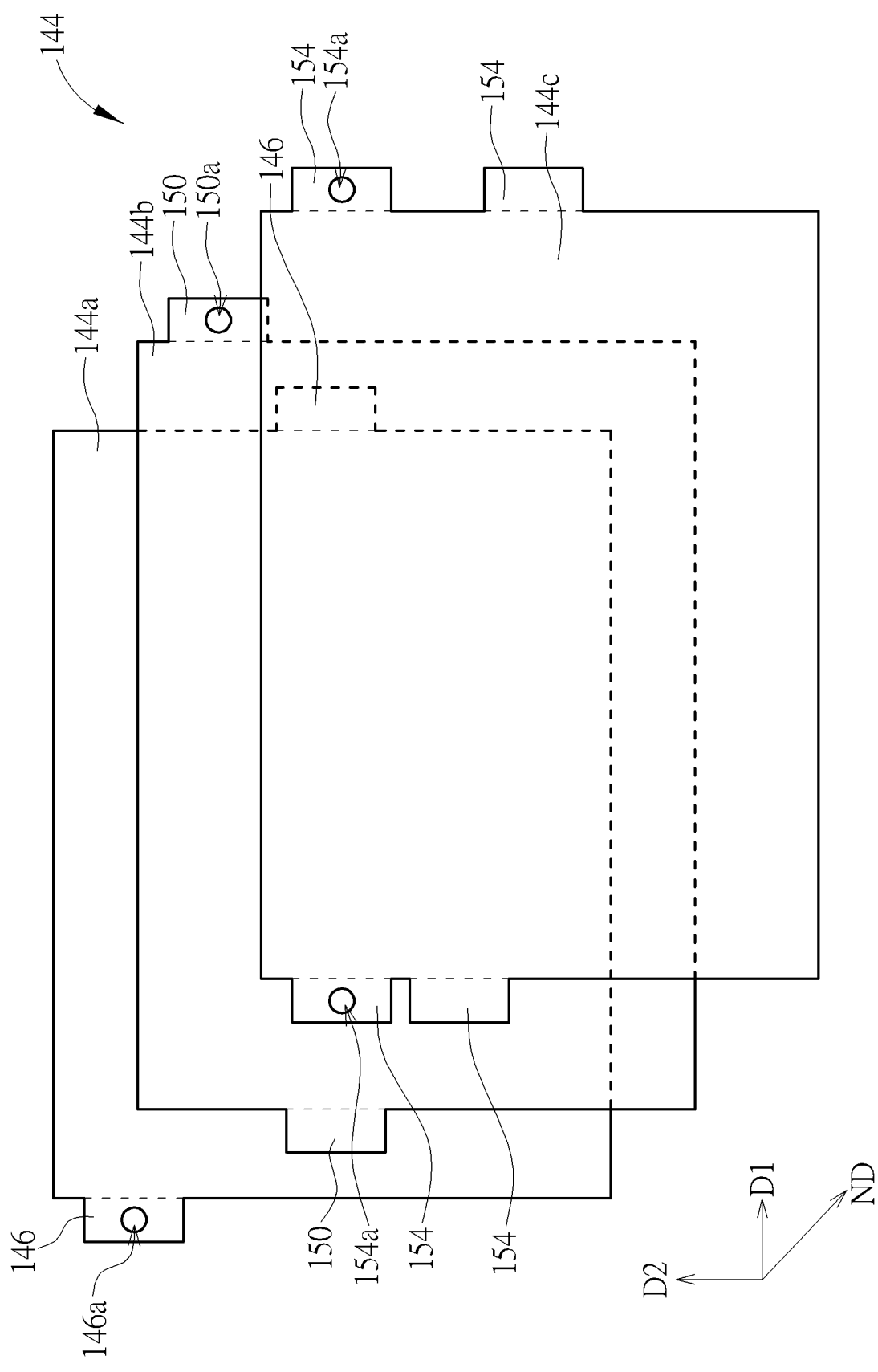
FIG. 6 is an exploded schematic view of an optical film stack according to an embodiment of the present disclosure.

Besides, the backlight module 120 in this embodiment may further include the optical film stack 144 disposed on the light emitting surface 126d of the light guide plate 122. The optical film stack 144 may include at least one optical film for decreasing the loss of the light entering the display panel 110 from the light emitting surface 126d of the light guide plate 122 and increasing the uniformity of the light entering the display panel 110. FIG. 6 is an exploded schematic view of the optical film stack according to an embodiment of the present disclosure. As shown in FIG. 6, the optical film stack 144 in this embodiment may include three layers of optical films 144a, 144b, 144c disposed sequentially on the light emitting surface 126d. The optical films 144a, 144b, 144c may for example respectively be a diffuser film, a first brightness enhancement film (BEF) and a second brightness enhancement film, but not limited thereto. The first brightness enhancement film and the second brightness enhancement film may respectively include a plurality of strip-shaped prisms, the strip-shaped prisms of the first brightness enhancement film and the strip-shaped prisms of the second brightness enhancement film may cross each other. The number and type of the layers of the optical film stack 144 are not limited to the above, and person skilled in the art should know that the optical film stack may include other optical layers, for example, it may further include a brightness enhancement film for increasing the light exiting rate.

In this embodiment, in order to correctly dispose the optical films 144a, 144b, 144c in the main recess MR of the frame 140, the frame 140 and the optical films 144a, 144b, 144c may also have mistake-proofing design. Specifically, the optical film 144a may include at least one third protrusion part 146, for example, the optical film 144a may have two third protrusion parts 146. Furthermore, the first portion P1 of the frame 140 may further include a fourth recess R4, the second portion P2 may further include a fifth recess R5, and the third protrusion parts 146 of the optical film 144a are respectively accommodated in the fourth recess R4 and the fifth recess R5. For example, the fourth recess R4 may has a protrusion pillar 148, the third protrusion part 146 of the optical film 144a corresponding to the fourth recess R4 may selectively has an opening 146a and the size of the opening 146a may be about the same as or slightly greater than the top-view area of the protrusion pillar 148. Thereby, through penetrating the opening 146a with the protrusion pillar 148, the third protrusion part 146 may be fixed in the fourth recess R4, such that the optical film 144a may be fixed on the frame 140. Also, the fourth recess R4 and the fifth recess R5 are not aligned to each other in the first direction D1 and have a shift. Through the design of the aforementioned optical film 144a and the frame 140, no misplacement of the upper surface and the lower surface the optical film 144a occurs, and the optical film 144a may be fixed precisely when disposing the optical film 144a on the frame 140. In this embodiment, the optical film 144b may have two fourth protrusion parts 150, the frame 140 may further have a sixth recess R6 and a seventh recess R7, and the fourth protrusion parts 150 may be respectively disposed correspondingly to the sixth recess R6 and the seventh recess R7. That is, the fourth protrusion parts 150 may be respectively accommodated in the sixth recess R6 and the seventh recess R7. Furthermore, the sixth recess R6 may also have a protrusion pillar 152, the fourth protrusion part 150 of the optical film 144b that corresponds to the sixth recess R4 may selectively have an opening 150a, and the size of the opening 150a may be about the same as or slightly greater than the top-view area of the protrusion pillar 152. Besides, the optical film 144c may has four fifth protrusion parts 154 respectively accommodated in the fourth recess R4, the fifth recess R5, the sixth recess R6 and the seventh recess R7. Also, the fifth protrusion part 154 that corresponds to the fourth recess R4 and the fifth protrusion part 154 that corresponds to the sixth recess R6 may respectively have an opening 154a, such that the protrusion pillar 148 and the protrusion pillar 152 may also respectively penetrate through the opening 154a to fix the optical film 144c. It is noted that, the light guide plate 122 and the optical film 144a are not at the same level surface, the first recess R1 and the second recess R2 are respectively used for accommodating the first protrusion part 128 and the second protrusion part 130 of the light guide plate 122, and the fourth recess R4 and the fifth recess R5 are respectively used for accommodating the third protrusion parts 146 of the optical film 144a on the light guide plate 122, so the depth of the fourth recess R4 and the depth of the fifth recess R5 may be different from the depth of the first recess R1 and the depth of the second recess R2, for example, the depth of the fourth recess R4 and the depth of the fifth recess R5 are less than the depth of the first recess R1 and the depth of the second recess R2. Similarly, the depth of the sixth recess R6 and the depth of the seventh recess R7 may be less than the depth of the fourth recess R4 and the depth of the fifth recess R5.

The display device is not limited to the aforementioned embodiment, and may have other different variant embodiments. To simplify the description, the identical components in each of the following variant embodiments or embodiments are marked with identical symbols. For making it easier to compare the difference between the aforementioned embodiment and the variant embodiments, the following description will detail the dissimilarities between the variant embodiments and aforementioned embodiments, and the identical features will not be redundantly described.

Figure 7:
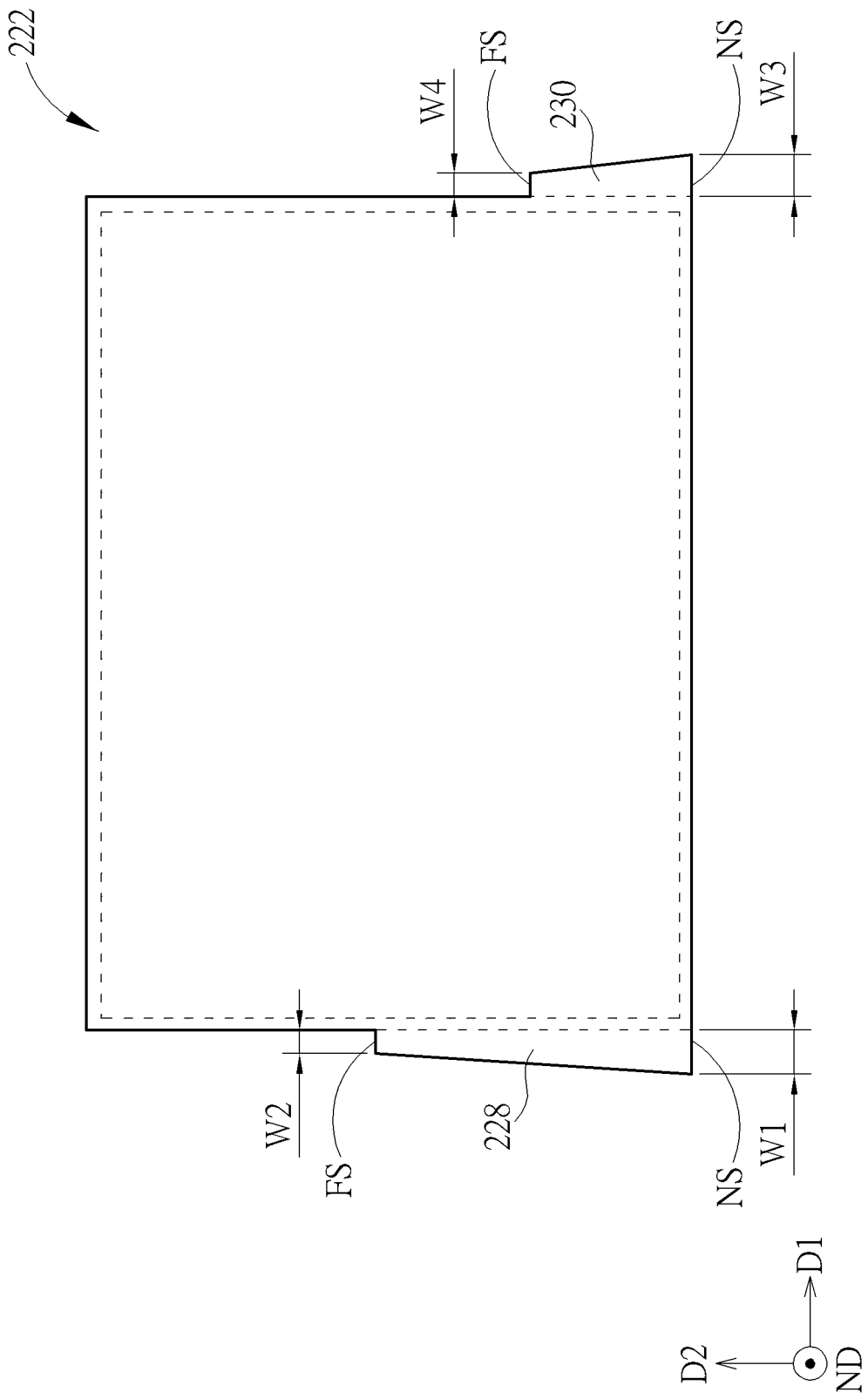
FIG. 7 is a top-view schematic diagram of a light guide plate according to a variant embodiment of the present disclosure.

FIG. 7 is a top-view schematic diagram of a light guide plate according to a variant embodiment of the present disclosure. As shown in FIG. 7, as compared with the aforementioned embodiment, the first protrusion part 228 and the second protrusion part 230 of the light guide plate 222 in this variant embodiment do not have uniform width in the first direction D1, the first protrusion part 228 does not have a first sub-portion, the second protrusion part 230 does not have a second sub-portion. Specifically, the width W1 of the first protrusion part 228 at the near-light side NS in the first direction D1 is greater than the width W2 of the first protrusion part 228 at the far-light side FS of the first protrusion part 228 in the first direction D1. Also, the width W3 of the second protrusion part 230 at the near-light side NS in the first direction D1 is greater than the width W4 of the second protrusion part 230 at the far-light side FS in the first direction D1. That is to say, the width of a portion of the first protrusion part 228 in the first direction D1 becomes smaller as the portion of the first protrusion part 228 is closer to the far-light side FS, and similarly, the width of the second protrusion part 230 in the first direction D1 may also become smaller as the second protrusion part 230 is closer to the far-light side FS.

Figure 8:
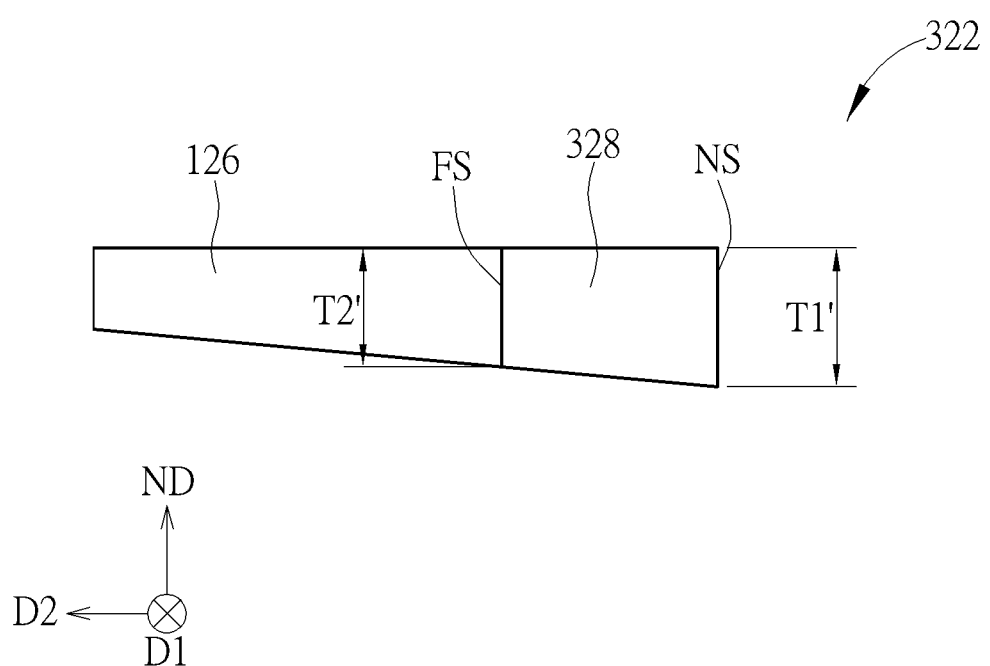
FIG. 8 is a side-view schematic diagram of a light guide plate according to another variant embodiment of the present disclosure.

FIG. 8 is a side-view schematic diagram of a light guide plate according to another variant embodiment of the present disclosure. As shown in FIG. 8, as compared with the aforementioned embodiment, the first protrusion part 328 and the second protrusion part of the light guide plate 322 in this variant embodiment do not have consistent width in the normal direction ND. To clarify the illustration, FIG. only illustrates the first protrusion part 328 and does not illustrate the second protrusion part, but not limited thereto. Specifically, the thickness T1' of the first protrusion part 328 at the near-light side NS in the normal direction ND is greater than the thickness T2' of the first protrusion part 328 at the far-light side FS. That is to say, the closer to each other a portion of the first protrusion part 328 and the far-light side FS are, the smaller the thickness of the portion of the first protrusion part 328 is. For example, the variation of the thickness of the first protrusion part 328 may be the same as the variation of the thickness of the main body part 126. Similarly, in this variant embodiment, the smaller the distance from a portion of the second protrusion part to the far-light side FS is, the smaller the thickness of the portion of the second protrusion part is, and the variation of the thickness of the second protrusion part may for example be the same as the variation of the thickness of the main body part 126.

To sum up, in the display device of the present disclosure, through designing the first length of the first protrusion part to be different from the second length of the second protrusion part, the misplacement of the light emitting surface and the back surface of the light guide plate or inversion of the upper surface and the lower surface of the optical film may be avoided. Furthermore, when the first length of the first protrusion part is greater than the second length of the second protrusion part, the first distance may be adjusted to be smaller than the second distance, such that the intensity of the light reflected by the corner of the second protrusion part may be approximate to the intensity of the light reflected by the corner of the first protrusion part, thereby increasing the uniformity of the backlight.

For those skilled in the art, the technical features disclosed in the aforementioned embodiments can be replaced or recombined with one another to constitute another embodiment without departing from the spirit of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

The invention claimed is:

1. A display device, comprising:
   a display panel;
   a light guide plate for guiding light to the display panel, the light guide plate comprising a main body part, a first protrusion part and a second protrusion part, the main body part comprising a first side, a second side and a light incident side, the first side and the second side being opposite to each other, the light incident side being connected to the first side and the second side, the first protrusion part being disposed at the first side, the first protrusion part having a first outer side opposite to the first side, the second protrusion part being disposed at the second side, and the second protrusion part having a second outer side opposite to the second side, wherein the first protrusion part has a first length at the first side, the second protrusion part has a second length at the second side, and the first length is greater than the second length; and
   a plurality of light sources adjacent to the light incident side of the main body part, the light sources being arranged along a first direction, the light sources comprising a first light source closest to the first protrusion part and a second light source closest to the second protrusion part, wherein the first light source is separated from the first outer side of the first protrusion part by a first distance in the first direction, the second light source is separated from the second outer side of the second protrusion part by a second distance in the first direction, and the first distance is less than the second distance.

2. The display device of claim 1, wherein the first protrusion part comprises a near-light side and a far-light side opposite to each other, the near-light side is closer to the first light source than the far-light side, a width of the first protrusion part at the near-light side in the first direction is greater than a width of the first protrusion part at the far-light side in the first direction.

3. The display device of claim 1, wherein the light guide plate has a light emitting surface, the light emitting surface has a normal direction, a thickness of the first protrusion part in the normal direction is different from a thickness of the main body part at the light incident side in the normal direction.

4. The display device of claim 1, wherein the light guide plate has a light emitting surface, the light emitting surface has a normal direction, the first protrusion part comprises a near-light side and a far-light side opposite to each other, the near-light side is closer to the first light source than the far-light side, a thickness of the first protrusion part in the normal direction is different from a thickness of a portion of the main body part corresponding to the far-light side in the normal direction.

5. The display device of claim 1, wherein the light guide plate has a light emitting surface, the light emitting surface has a normal direction, the first protrusion part comprises a near-light side and a far-light side opposite to each other, the near-light side is closer to the first light source than the far-light side, a thickness of the first protrusion part at the near-light side in the normal direction is greater than a thickness of the first protrusion part at the far-light side in the normal direction.

6. The display device of claim 1, wherein the first protrusion part has a first sub-portion, the first sub-portion is protruded from the light incident side of the main body part, the first side extends along a second direction, and a thickness of the first sub-portion in the second direction is greater than a thickness of the first light source in the second direction.

7. The display device of claim 1, wherein the first light source is separated from the first side by a third distance in the first direction, the second light source is separated from the second side by a fourth distance in the first direction, and the third distance is less than the fourth distance.

8. The display device of claim 7, wherein a difference between the third distance and the fourth distance is greater than or equal to 1 mm and less than or equal to 10 mm.

9. The display device of claim 1, wherein the light guide plate has a light emitting surface, a back surface and a scattering structure, the light emitting surface and the back surface are opposite to each other, and the scattering structure is located at the back surface.

10. The display device of claim 1, wherein the light sources are spaced apart and arranged sequentially in the first direction, and the light sources are spaced apart from the light guide plate.

11. The display device of claim 1, further comprising:
a flexible circuit board comprising a connection part and an extension part, the connection part is connected to the extension part, the light sources are disposed on the connection part, and a portion of the extension part is adjacent to the second outer side.

12. The display device of claim 11, further comprising:
a frame comprising a first portion and a second portion, the first portion being adjacent to the first side of the main body part, and the second portion being adjacent to the second side of the main body part, wherein the first portion comprises a first recess for accommodating the first protrusion part, and the second portion comprises a second recess for accommodating the second protrusion part.

13. The display device of claim 12, further comprising:
a chip disposed on the extension part, wherein the second portion further comprises a third recess for accommodating the chip.

14. The display device of claim 12, further comprising:
a back plate for accommodating the light guide plate, wherein the back plate comprises an opening, and another portion of the extension part penetrates through the opening.

15. The display device of claim 14, wherein the light sources are disposed between the light incident side of the light guide plate and a sidewall of the back plate.

16. The display device of claim 14, wherein a portion of the frame is located between the back plate and the light guide plate.

17. The display device of claim 16, wherein the light guide plate comprises a light emitting surface and a back surface opposite to each other, the back surface is not parallel to the light emitting surface, the portion of the frame comprises a bottom surface, and the bottom surface is parallel to the back surface.

18. The display device of claim 12, further comprising:
at least one optical film disposed on the light guide plate, and the optical film comprises two third protrusion parts, wherein the first portion has a fourth recess, the second portion has a fifth recess, the two third protrusion parts are respectively accommodated in the fourth recess and the fifth recess.

19. The display device of claim 1, further comprising a reflector, the light guide plate having a light emitting surface and a back surface opposite to each other, and the reflector being adjacent to the back surface of the light guide plate.

* * * * *